Figure 1:
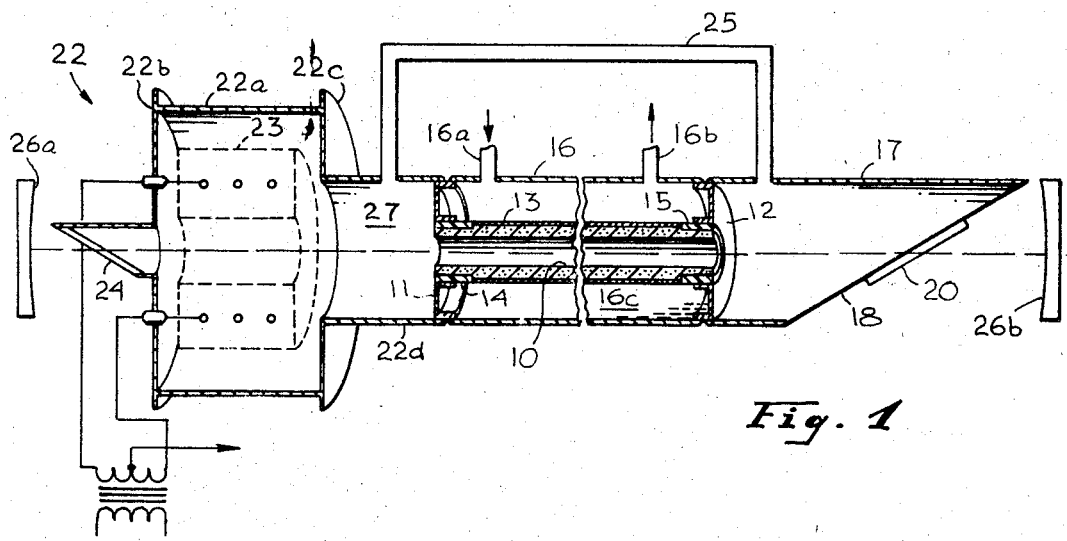

April 8, 1969  AKIRA OKAYA ETAL  3,437,950
ION LASER HAVING A METAL TUBE SHRINK-FITTED ONTO
THE CERAMIC DISCHARGE TUBE
Filed Nov. 12, 1965

INVENTORS
AKIRA OKAYA
SERGE DE WITTE
BY
*Allen E. Botney*
ATTORNEY

United States Patent Office 3,437,950
Patented Apr. 8, 1969

3,437,950
ION LASER HAVING A METAL TUBE SHRINK-FITTED ONTO THE CERAMIC DISCHARGE TUBE
Akira Okaya, Pasadena, and Serge de Witte, West Los Angeles, Calif., assignors to Electro-Optical Systems, Inc., a corporation of California
Filed Nov. 12, 1965, Ser. No. 507,349
Int. Cl. H01s 3/22
U.S. Cl. 331—94.5    7 Claims The present invention relates to the laser art in general and more particularly relates to a novel metal and ceramic structure for high-power ionized gas lasers.

Heat dissipation and structural fragility have always been two problem sources in the laser field, especially in connection with the high-powered ionized gas type of laser. More specifically, due to the relatively high temperatures generated during the operation of such a laser, it is essential that some effective means be provided to conduct the heat away, not only to avoid a possible deterioration of the operation itself, but also to avoid breakage and, therefore, permanent damage to and loss of this expensive equipment. However, to date, the problem has not been satisfactorily resolved.

The present invention overcomes the above-mentioned limitations, deficiencies and difficulties that are encountered among ionized gas lasers in the prior art, and it does so by providing a laser structure that is primarily constructed of metal and ceramic materials, with the metal and ceramic parts being uniquely shaped and interconnected in such a manner that the heat dissipated is efficiently carried away and wherein the stresses and strains, which oftentimes result in breakage, are kept to a minimum. More particularly, in an embodiment of the present invention, a rare gas, such as argon, xenon, krypton, helium and neon, or a mixture of them, is sealed in a tube made almost entirely of metal and ceramic materials. An anode and a cathode are mounted within and form a part of the tube envelope at opposite ends thereof, and the space between them is choked by a long capillary tube that is also made of a ceramic material. When a discharge of the gas is excited between the anode and cathode, the electron currents are forced to go through the capillary tube, thereby significantly increasing the current density. This high current density, in turn, creates a plasma wherever excitation and ionization of the gas has taken place and it does so with a high degree of efficiency. As a result of this high degree of ionization of the gas, atoms therein are excited to an upper laser state which later make the transition to a lower laser level to radiate the laser beam. As is well known, the laser oscillation is excited between the internal or external mirrors that form an optical resonator therebetween.

In accordance with the present invention, the discharge tube, in order to accommodate high-temperature plasma, is made of a ceramic material and a thin metal tube is shrink-fitted over it that prevents the discharge tube from cracking, thereby greatly extending the operating life of the laser device. The discharge tube is directly connected to metal caps at both ends and these metal caps are, in turn, respectively connected both mechanically and electrically to the cathode and anode. The outside surface of the capillary or discharge tube is placed in contact with either a circulating coolant fluid or a plurality of metal fins by means of which the heat energy is carried away from the discharge tube. Also, in accordance with the present invention, the anode is fabricated as a metal cylinder and is mounted as a part of the envelope structure, the heat dissipated at the anode being efficiently carried either by the coolant fluid, or the fins, whichever is used. The advantages of a laser structure according to the present invention are manyfold, some of the more important ones being as follows:

(a) The lifetime limit of an ionized gas laser, which is normally affected by the high-temperature chemical reaction of the discharge tube itself, is extended many orders of magnitude through the use of a heat-resistive and high heat-conductive ceramic tube as the discharge tube. For example, with such a discharge-tube arrangement, the operating life of such a laser has already been extended to about 680 hours as compared to the usual 100 hours of the prior devices.

(b) The metal tube that is shrink-fitted over the ceramic discharge tube adds considerable support to it, with the result that the metal-ceramic discharge tube structure is much stronger than those used in the prior art.

(c) Shrink-fitting a metal tube over the ceramic discharge tube provides a good interface contact for heat-transfer purposes and, furthermore, significantly reduces the temperature gradient through the wall of the discharge tube, thereby reducing the possibility of breakage.

(d) An anode electrode that is made of metal and that is also made a part of the gas-cell envelope makes for a simple, overall structure which, in turn, makes it possible to efficiently cool the electrode directly from the outside wall of the envelope.

(e) The direct connection of metal parts to the ends of a ceramic discharge tube of uniform inside and outside diameter keeps the stress in the ceramic tube at a minimum, thereby additionally helping to avoid breakage of the ceramic tube at high-temperature operation.

(f) Since the ceramic portion of the entire structure is limited or confined only to where the high-temperature plasma is located, the discharge tube is therefore quite simple in its construction, with the result that the cost of manufacture is thereby very materially reduced.

It is, therefore, an object of the present invention to provide a structure that extends the useful life of high-power ionized gas lasers.

It is a further object of the present invention to provide a high-power ionized gas laser structure that can withstand high operating temperatures for long periods of time.

It is an additional object of the present invention to provide a gas laser structure that has efficient heat-transfer qualities and, therefore, a structure that facilitates the carrying away of the heat dissipated during its operation.

It is another object of the present invention to provide means for increasing the support of discharge tubes in gas laser structures, for reducing the temperature gradient through the walls of such tubes, and for providing good interface contact with their surfaces.

The novel features which are believed to be characteristic of the invention, both as to its organization and method of operation, together with further objects and advantages thereof, will be better understood from the following description considered in connection with the accompanying drawings in which a couple of embodiments of the invention are illustrated by way of example. It is to be expressly understood, however, that the drawings are for the purpose of illustration and description only, and are not intended as a definition of the limits of the invention.

Figure 2A:
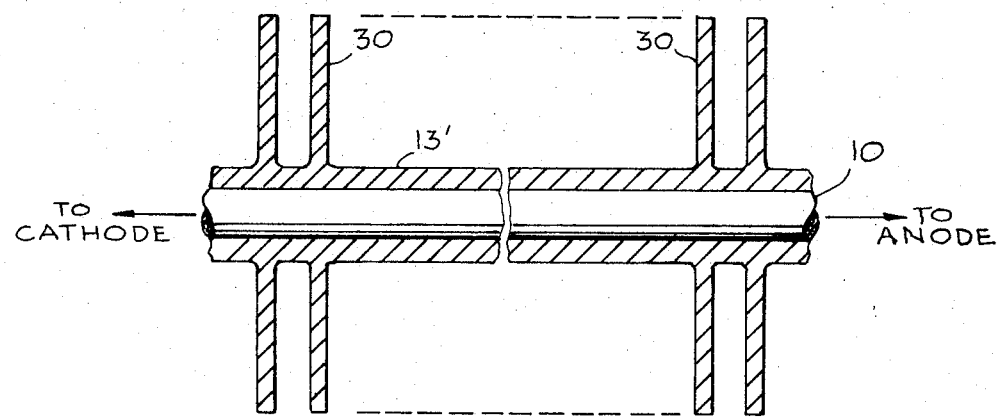
Figure 2B:
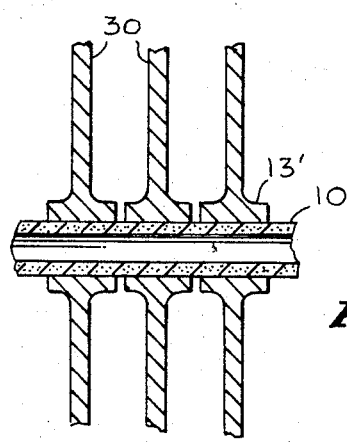

FIGURE 1 illustrates the basic construction of a first embodiment of a metal and ceramic gas laser structure according to the present invention in which a circulating fluid is used for coolant purposes; and FIGURES 2(a) and 2(b) illustrate the basic construction of a second embodiment of a metal and ceramic gas laser structure according to the present invention in which metal fins are employed for heat-transfer purposes.

For a consideration of the invention in detail, reference is now made to the drawings wherein like or similar parts or elements are given like or similar designations throughout the several figures. In FIG. 1, embodiment therein is shown to include an elongated and cylindrically-shaped discharge tube 10 made of a highly heat-resistant materil, such as a ceramic material, alumina (Al₂O₃), magnesia (MgO), berryllium oxide (BeO), boron nitrite (Bn), and zirconia (ZrO₂) being a few examples of ceramic materials that may be used herein. Discharge tube 10 is mounted on a pair of annular-shaped metal caps 11 and 12 that are respectively fitted over the hermetically sealed to the ends of the discharge tube. The caps are annular, as previously mentioned, and, therefore, have central openings into which the ends of the discharge tube are respectively fitted. In the preferred arrangement, caps 11 and 12 have rims or walls along both their inner and outer edges so that they have a generally U-shaped configuration in cross-section. The ends of discharge tube 10 fit snugly into the inner cylinder of the caps, with the result that the caps are held firmly in an upright position on the discharge tube as shown in the figure. Furthermore, for reasons that will be clearer later, the ends of the discharge tube are hermetically sealed to caps 11 and 12 and any appropriate sealing material and technique may be used toward this end.

Shrink-fitted over discharge tube 10 is a metal tube 13 that extends for substantially the full length of the discharge tube but which does not reach and, therefore, does not contact metal caps 11 and 12 in order, as will be seen more clearly later, to avoid the discharge from shorting out. More specifically, to prevent electrical shorts, insulative rings 14 and 15 as respectively mounted between the ends of metal tube 13 and metal caps 11 and 12.

Mounted concentrically with discharge tube 10 is a cylindrically-shaped jacket 16 that has an input port 16a and an output port 16b by means of which, as will be seen below, a coolant fluid respectively enters and leaves the jacket chamber 16c therebetween. Jacket 16 rests on the projecting annulus of the aforesaid outer walls of metal caps 11 and 12 and are hermetically sealed to them as well. Thus, as is shown in the figure, discharge tube 10 with metal tube 13 and insulative rings 14 and 15 around it, jacket 16, and caps 11 and 12 together from a hollow cylindrically shaped member in which the hollow is formed as an annular-shaped cylindrical chamber 16c through which a coolant fluid may be made to flow by means of ports 16a and 16b.

Also resting on the outer wall of cap 12 is a metal cylinder 17 which, in the laser structure of the present invention, constitutes the anode. More specifically, cylinder 17 has the same inner diameter as the outer diameter of cap 12 and is hermetically sealed to the cap by welding or brazing. At the other end of the anode structure, however, the anode cylinder is preferably cut at the desired Brewster angle and a metal plate 18, in which a Brewster window 20 is centrally mounted, hermetically encloses or seals that end of the cylinder by suitable welding or brazing techniques. Accordingly, anode 17 is, in the present invention, a hollow metal cylinder structure that is sealed at one end by an appropriate end plate 18 in which a Brewster window 20 is suitably mounted. It should be mentioned, however, that at its other end anode 17 is only partially enclosed and that discharge tube 10 couples with or, stated differently, enters upon or opens into the chamber formed by the cylindrical envelope of the anode.

Just as an anode is mounted on one end of the discharge tube assembly, a cathode structure is mounted on the other end of this assembly and this cathode structure basically comprises a hollow cylinder assembly 22 consisting of cylinder 22a and end plate 22b and 22c mounted coaxially with the cathode axis and laser beams. The cathode, designated 23, in this embodiment, has been given an annular or doughnut-shaped configuration, with the opening axially through the center of the cathode allowing the laser beam to get through to Brewster window 24 mounted in end plate 22b. Cylinder assembly 22 is hermetically sealed to tubular section 22d which, in turn, is hermetically sealed to end cap 11 as before. Tubular section 22d couples with the discharge tube which opens into or communicates with the space formed by element 22d. As previously noted, housing 22, at one end, is mechanically mounted on and sealed to element 22d and, therefore, housing 22 also communicates with discharge tube 10. The other end of the housing, however, is closed, but includes Brewster window 24 mounted in it at the appropriate angle. As will be recognized by those skilled in the art, Brewster windows 20 and 24 lie along the axis of the described laser apparatus and, therefore, are aligned or in registration with one another.

Completing the FIG. 1 apparatus is a pressure-equalizing tube 25, a pair of mirrors 26a and 26b adapted for laser purposes, and a gas 27, preferably one of the rare gases, such as, for example, argon, xenon, krypton, helium, and neon, or a mixture of them, sealed into and filling the space formed by the above-described cathode, anode and discharge tube elements. It should be mentioned that except for the desired gas 27, which is present in the pressure-range of 5 millitorr to 50 torr, the referred-to space is evacuated However, during the operation of the laser, a substantial differential in gas pressure develops across the discharge tube. Therefore, pressure-equalizing tube 25 is employed to equalize this pressure throughout the entire structure and thereby prevent excessive and possibly damaging pressures from building up at any point. Pressure-equalizing tube 25 is preferably made of glass and, as can be seen from FIG. 1, it communicates with the space on both sides of discharge tube 10, that is to say, it communicates with the anode and cathode chambers, with the result that any pressure differential existing between the cathode and anode ends of the laser structure is corrected or relieved through this tube. Finally, it should briefly be stated that mirrors 26a and 26b are positioned to produce an optical resonator therebetween in accordance with established laser practice.

In operation, the gas discharge from the cathode to the anode is forced to flow through the narrow channel of discharge tube 10, thereby significantly increasing the current density. This high-current density, in turn, creates a high degree of ionization and excitation of the gas. As a result of this large ionization percentage of the gas, atoms are excited to an upper laser state and when they then make the transition to a lower laser level, a laser beam is produced that is confined and enhanced by the optical resonator formed by mirrors 26a and 26b. The rest is well known and its description is therefore avoided. Suffice it to say that a considerable amount of heat is generated in the discharge capillary tube and to take care of it a coolant fluid, such as water, is pumped through input port 16a into jacket chamber 16c. Accordingly, the water surrounds and comes into contact with metal layer 13, accepts the heat that is generated in the discharge tube and passed through the surrounding metal layer, and then flows out through output port 16b, thereby limting the possible rise in temperature and, in turn, significantly reducing the possibility of damage to the structure. A laser structure of the kind described in connection with FIG. 1 is mechanically and thermally stronger than the more commonly used structures with glass or quartz capillary discharge tubes.

A second embodiment of the invention in which a different heat transfer or cooling arrangement is employed is illustrated in FIGS. 2(a) and 2(b) to which reference is now made. More particularly, to avoid the complication of a water cooling system, an air-cooled heat dissipation system is provided in this second embodiment and, as shown therein, instead of a water jacket, a plurality of metal fins 30 are used by means of which cooling takes place by either natural air convection or forced air flow. The metal fins are mounted in an upright position on the discharge tube and are preferably assembled so that the individual fins are electrically insulated from each other to facilitate starting of the discharge.

Although a number of different kinds of techniques are available and may be used to mount air-cooling fins onto the discharge tube, it has been difficult to find a single economical, simple and reliable method. However, the following method has been found to be quite effective and to fulfill the above-mentioned requirements. More specifically, as shown by the structure in FIG. 2(a), the metal the metal fins and the metal tube surrounding the discharge tube, the metal tube being designated 13' in this figure, are first cast and then shrink-fitted onto ceramic discharge tube 10, the cast metal fins 30 and the tube 13' preferably having a much higher thermal expansion coefficient than that of the discharge tube 10 so that they will remain in tension and thereby prevent cracking of the ceramic tube. Aluminum is preferred as the metal for the fins and tube and by using various alloys of aluminum, the characteristics of the fins and tube can be adjusted so as to optimize the arrangement between them and the ceramic tube. Furthermore, the oxide of aluminum is alumina (a ceramic) so that a good inter-boundary match between the metal fins and the tube is thereby obtained. Aluminum is also preferred because of its high heat conductivity quality and also that it lends itself very nicely to casting processes. A further advantage of aluminum is its relatively light weight which thereby contributes to the weight reduction and strength of the laser head.

It has been found that discharges will go through the ceramic tube 10 even though the outside of the tube is entirely covered by a metal block and electrically equipotential. However, in order to facilitate initiation of the discharge, it is recommended that the cooling fins be mounted individually or in sections so that the desired potential gradient can be created along the discharge tube. As is indicated in FIG. 2(b), this can be done by sawing the valley portions of this solidly cast material to the ceramic surface of discharge tube 10 and then cleaning the exposed surface by means of chemicals, such as potassium hydroxide (KOH) or sodium hydroxide (NaOH). Thus, by so doing metal tube 13' is divided into a plurality of separate and distinct sections with each section having a fin on it, the several sections illustratively shown in FIG. 2(b) being designated 13'a, 13'b and 13'c. In this way the advantages of a shrink fit are retained while at the same time facilitating initiation of discharge. It should be mentioned that this method is far better than the casting of cooling fins in segments from the beginning. One advantage, for example, is that the cooling fins are cast after the ceramic tube is already attached to the metal end pieces, thereby significantly simplifying the process of construction.

Although a couple of particular arrangements of the invention have been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A gas-laser structure comprising a cylindrically-shaped discharge tube made of an insulative heat-resistant material; a pair of annular-shaped metal caps in which the ends of said discharge tube are respectively mounted; a metal tube shrink-fitted over said discharge tube between said metal caps; a cylindrical jacket having spaced inlet and outlet ports mounted concentrically with said discharge and metal tubes, said jacket being made of an insulative material and being supported at the ends thereof on the perimeters of said caps; a pair of metal members respectively mounted on the perimeters of said pair of caps on either side of said jacket and in alignment therewith; laser optical means respectively enclosing said members; cathode means mounted within the laser optical means enclosing one of said members; coolant means for causing a fluid to flow through said jacket via said inlet and outlet ports; and a pressure-equalizing tube intercoupling said members.

2. A gas-laser structure comprising: an evacuated structure of generally cylindrical configuration, said structure including a pair of outer chambers and a connecting tube axially disposed therebetween, at least a portion of the lateral walls of said outer chambers being made of metal and said connecting tube being made of ceramic; means mounted on said connecting tube for transferring heat away from said structure, said means including a metal tube shrink-fitted onto said connecting tube; a second tube intercoupling said outer chambers for equalizing the pressure in said structure; an optical arrangement mounted at the ends of said structure for producing an optical resonator therebetween; a pre-selected gas contained in said structure; and excitation means for converting said gas into a light-emitting plasma column.

3. The laser structure defined in claim 2 wherein said heat-transfer means includes a plurality of spaced metal fins mounted on the metal tube surrounding said ceramic connecting tube and extending outwardly therefrom.

4. The laser mechanism defined in claim 2 wherein said heat-transfer means includes a jacket surrounding the metal tube fitted onto said connecting tube, said jacket being adapted so that a coolant fluid can be passed therethrough and brought into contact with said metal tube to limit the temperature thereof; and fluid means for causing a fluid to flow under pressure through said jacket.

5. A gas-laser mechanism comprising: an evacuated structure of generally cylindrical configuration, said structure including a pair of outer chambers and a connecting discharge tube disposed therebetween, at least a portion of the lateral wall of said outer chambers being made of metal and said discharge tube being made of an insulator and heat-resistant material; means mounted on said discharge tube for transferring heat away from said structure, said means including a shrink-fitted metal tube divided into sections, and metal fins respectively mounted on said sections and extending outwardly therefrom; a pressure-equalizing tube intercoupling said outer chambers; an optical arrangement mounted at the ends of said structure for producing an optical resonator therebetween; a pre-selected gas contained in said structure; and excitation means mounted in said outer chambers for converting said gas into a light-emitting plasma column in said discharge tube.

6. A gas-laser structure comprising: an evacuated cylindrically-shaped member having metal outer sections and an electrically-insulative center section therebetween; a cylindrically-shaped discharge tube mounted centrally within said member and concentrically with the insulator center section thereof, said discharge tube being made of an electrically-insulative and heat-resistant material; a cylindrically-shaped metal tube shrink-fitted onto said discharge tube and extending for substantially the full length thereof; a pair of metal elements mounted on the ends of the center section of said member and said discharge tube to enclose the space therebetween, said metal elements being adapted and mounted to respectively contact the outer metal sections of said member; tubular means made of an insulative material coupled to the outer metal sections of said member for equalizing the gas pressures therein; means for causing a coolant fluid to flow through the enclosed space between said center section and said discharge tube; and a pair of Brewster windows respectively mounted in the end faces of said evacuated member.

7. The laser structure defined in claim 6 wherein said structure further includes at least one of the rare gases, means for transforming said gas into a plasma column along the axis of said member and a pair of mirrors respectively mounted adjacent the ends of said member and positioned to form an optical resonator.

References Cited

Labuda et al.: "Continuous-Duty Argon Ion Lasers," IEEE Journal of Quantum Electronics, vol. QE–1, pp. 273–279, September 1965.

Rigden: "A Metallic Plasma Tube for Ion Lasers," IEEE Journal of Quantum Electronics, vol. QE–1, p. 221, August 1965.

JEWELL H. PEDERSEN, *Primary Examiner.*

E. BAUER, *Assistant Examiner.*

U.S. Cl. X.R.

313—44